United States Patent
McMillan et al.

(10) Patent No.: US 7,673,308 B2
(45) Date of Patent: Mar. 2, 2010

(54) VIRTUAL OS COMPUTING ENVIRONMENT

(75) Inventors: John McMillan, Milford, MI (US); Gary Chirhart, Ann Arbor, MI (US)

(73) Assignee: Symantec Corporation, Mountain View, CA (US)

( * ) Notice: Subject to any disclaimer, the term of this patent is extended or adjusted under 35 U.S.C. 154(b) by 1746 days.

(21) Appl. No.: 10/716,337

(22) Filed: Nov. 18, 2003

(65) Prior Publication Data

US 2005/0076326 A1 Apr. 7, 2005

Related U.S. Application Data

(60) Provisional application No. 60/427,339, filed on Nov. 18, 2002.

(51) Int. Cl.
*G06F 9/00* (2006.01)
*G06F 9/44* (2006.01)

(52) U.S. Cl. .................................... 719/331; 717/127

(58) Field of Classification Search .................. 718/1; 719/331, 310, 320; 717/127
See application file for complete search history.

(56) References Cited

U.S. PATENT DOCUMENTS

| | | | | |
|---|---|---|---|---|
| 5,961,582 A | * | 10/1999 | Gaines | 718/1 |
| 6,081,897 A | * | 6/2000 | Bersson | 726/32 |
| 6,141,698 A | * | 10/2000 | Krishnan et al. | 719/331 |
| 6,192,471 B1 | * | 2/2001 | Pearce et al. | 713/2 |
| 6,397,242 B1 | * | 5/2002 | Devine et al. | 718/1 |
| 6,611,878 B2 | * | 8/2003 | De Armas et al. | 719/328 |
| 6,615,277 B1 | * | 9/2003 | Curtis | 719/310 |
| 6,754,889 B1 | * | 6/2004 | Leverenz | 717/127 |
| 6,785,886 B1 | * | 8/2004 | Lim et al. | 718/1 |
| 7,028,305 B2 | * | 4/2006 | Schaefer | 719/310 |
| 2002/0092003 A1 | * | 7/2002 | Calder et al. | 717/138 |

OTHER PUBLICATIONS

Hall et al., "A Virtual Operating System", Sep. 80, ACM, vol. 23 No. 9, pp. 495-502.*
Nasika, "Transparent Migration of Distributed Communicating Processes", Aug. 2000.*
John Robbins, "Bugslayer", Microsoft Systems Journal, Feb. 1998.

* cited by examiner

*Primary Examiner*—Li B Zhen
*Assistant Examiner*—Phuong N Hoang
(74) *Attorney, Agent, or Firm*—Advantedge Law Group

(57) ABSTRACT

Multiple, semi-independent virtual operating system (OS) environments coexist within a single (OS) such that a change made in one environment does not affect the main OS or any other environment. In this way each virtual OS environment appears to be an independent OS for the applications running within it. The file system and registry information for each environment is independent of the base OS and other environments. Each of the environments can contain a group of installed applications that will run independently of each other. Although the invention is described in terms of a Windows® environment, the approach is applicable to other operating systems through appropriate modification.

18 Claims, 4 Drawing Sheets

VIRTUAL OS COMPUTING ENVIRONMENT

REFERENCE TO RELATED APPLICATION

This application claims priority from U.S. Provisional Patent Application Ser. No. 60/427,339, filed Nov. 18, 2002, the entire content of which is incorporated herein by reference.

FIELD OF THE INVENTION

This invention relates to computing environments and, in particular, to the creation of multiple, semi-independent virtual operating system (OS) environments within a single OS.

BACKGROUND OF THE INVENTION

An Operating System (OS) is the high-level software that allows users to interact with a computing machine and run programs (i.e., applications). To enhance the versatility of computers, virtual operating systems (VOS) and programs that implement virtual machines (VM) have been developed. Using such systems, applications "expecting" a particular OS may run on a machine executing a different OS, or commands generated by an application may cause a real computer to act like the imaginary machine. Theoretically, a VOS may allow the same program to work on virtually any machine running the Virtual OS, thereby supporting "instant portability" for new machines.

The concept of a virtual machine has been popularized by Pascal compilers which produce intermediate "p-code" and, more recently, by Java language from Sun Microsystems. Whereas most compilers produce object code for one family of CPU, Java compilers produce object code (called J-code) for machines that may or may not exist. For each physical target processor, a Java interpreter, or virtual machine, "executes" the J-code. This allows the same object code to run on any CPU for which a Java interpreter exists.

Other examples include Limbo, a programming language developed at Lucent Technologies, produces object code for an imaginary CPU, and Perl, which creates an intermediate program representation and executes this intermediate representation instead of creating native executable code.

The major standard operating systems, namely Windows® operating system by Microsoft Corporation, Macintosh® operating system by Apple Inc., and UNIX® operating system of The Open Group, make very different 'calls' to the OS. These calls are critical to writing sophisticated applications, which limits portability. Java solves this problem by providing a set of library functions that communicate with an imaginary OS and imaginary GUI (graphical user interface). In a sense, just like the JVM presents a virtual physical machine, the Java libraries present a virtual OS/GUI. Every Java implementation provides libraries implementing this virtual OS/GUI. Java programs that use these libraries to provide needed OS and GUI functionality port fairly easily.

Virtual operating systems include the Amiga OS, which is based on the Taos Elate OS, and Inferno developed by Lucent Technologies. Inferno, a virtual operating system running on top of the Linux operating system, is targeted to creating and supporting distributed services used in a variety of network environments, including advanced telephones, hand-held devices, TV/cable/satellite set-top boxes, Internet computers and conventional computing systems. Applications use various resources internal to the system, such as a consistent virtual machine that runs the application programs, together with library modules that perform services as simple as string manipulation through more sophisticated graphics services for dealing with text, pictures, higher-level toolkits, and video. Applications exist in an external environment containing resources such as data files that can be read and manipulated, together with objects that are named and manipulated like files but are more active.

SUMMARY OF THE INVENTION

This invention is directed to the creation of multiple, semi-independent virtual OS environments within a single operating system (OS). A change made in one environment does not affect the main OS or any other environment. In this way each virtual OS environment appears to be an independent OS for the applications running within it. The file system and registry information for each environment is independent of the base OS and other environments. Each of the environments can contain a group of installed applications that will run independently of each other. Although the invention is described in terms of a Windows® operating system environment, the approach is applicable to other operating systems through appropriate modification.

DETAILED DESCRIPTION OF THE INVENTION

Figure 1:
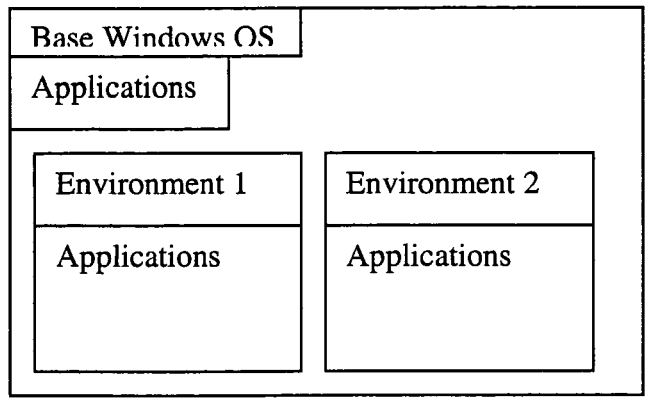
FIG. 1 is a simplified diagram showing the creation of multiple OS environments under a single OS.
Figure 2:
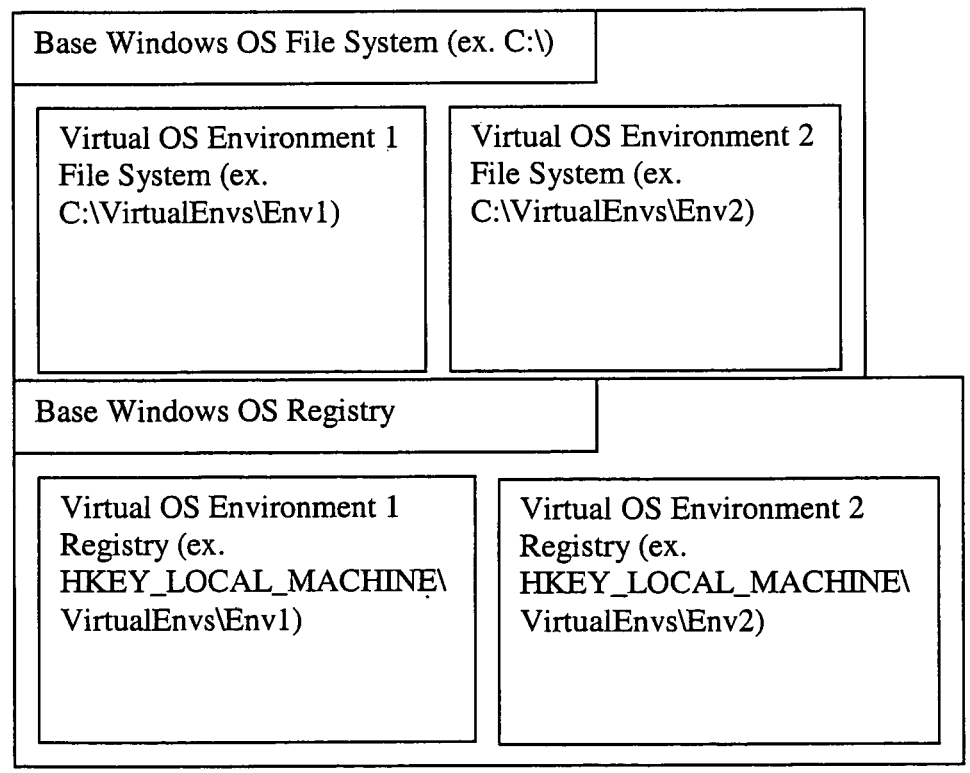
FIG. 2 is a illustrates the creation of independent locations for file systems and registry within the base OS file system and registry.
Figure 3:
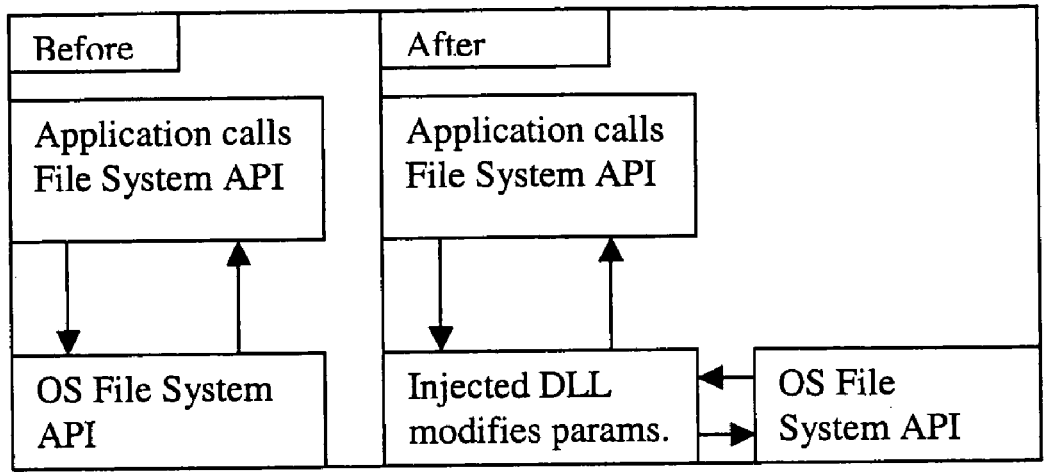
FIG. 3 shows how, according to the invention, injected DLL functions can execute code both before and after the OS API function.
Figure 4:
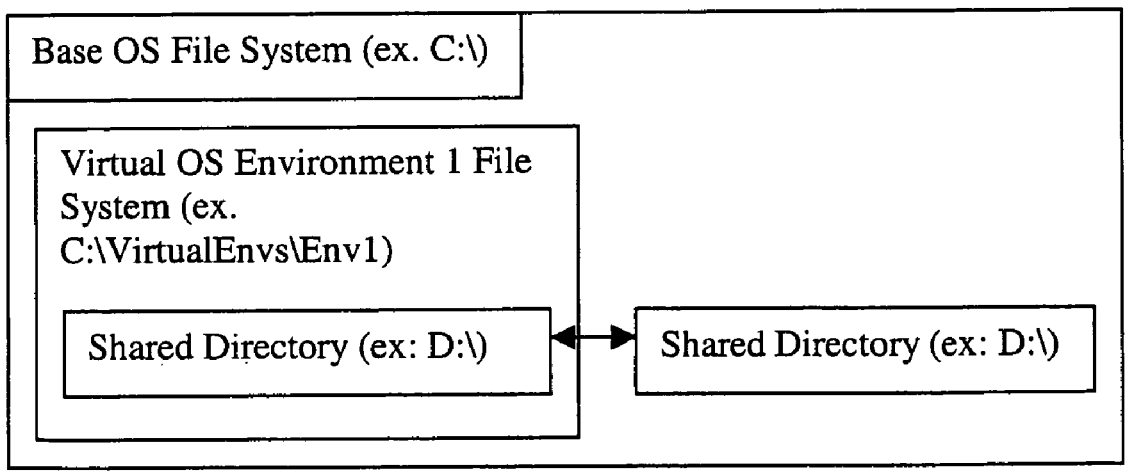
FIG. 4 shows how any applications that are run from under the virtual OS environment file system are always redirected into that virtual OS environment.
Figure 5:
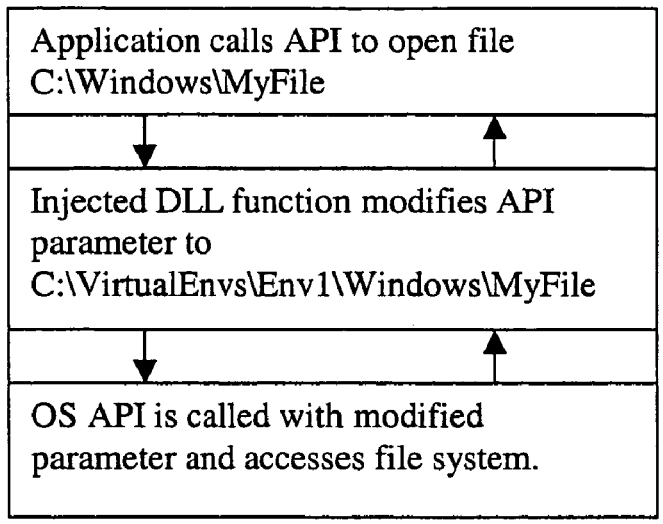
FIG. 5 depicts when application is being redirected into a virtual OS environment, it makes an API call that tries to access the file system or registry, causing the API to be redirected to a function in the injected DLL.
Figure 7:
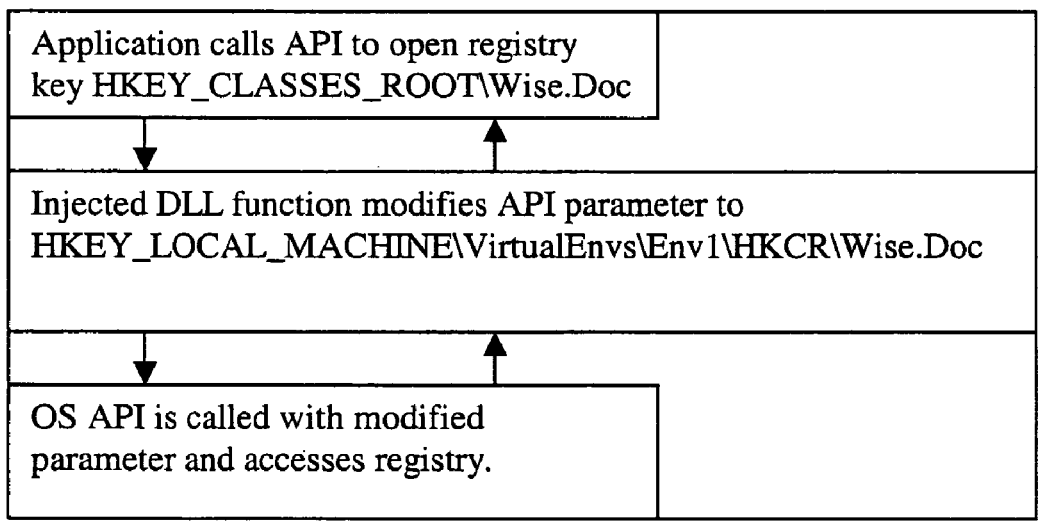
FIG. 7 is a diagram that depicts how OS API calls can be redirected by the injected DLL function modifying a parameter sent to or returned from the OS API.
Figure 6A:
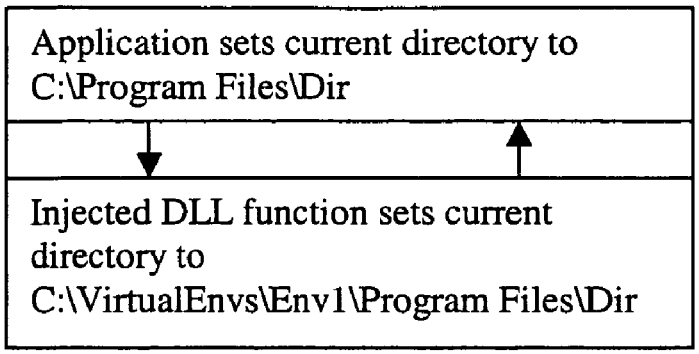
FIG. 6A is a diagram that shows how getting and setting of the current directory are redirected into the virtual OS environment.
Figure 6B:
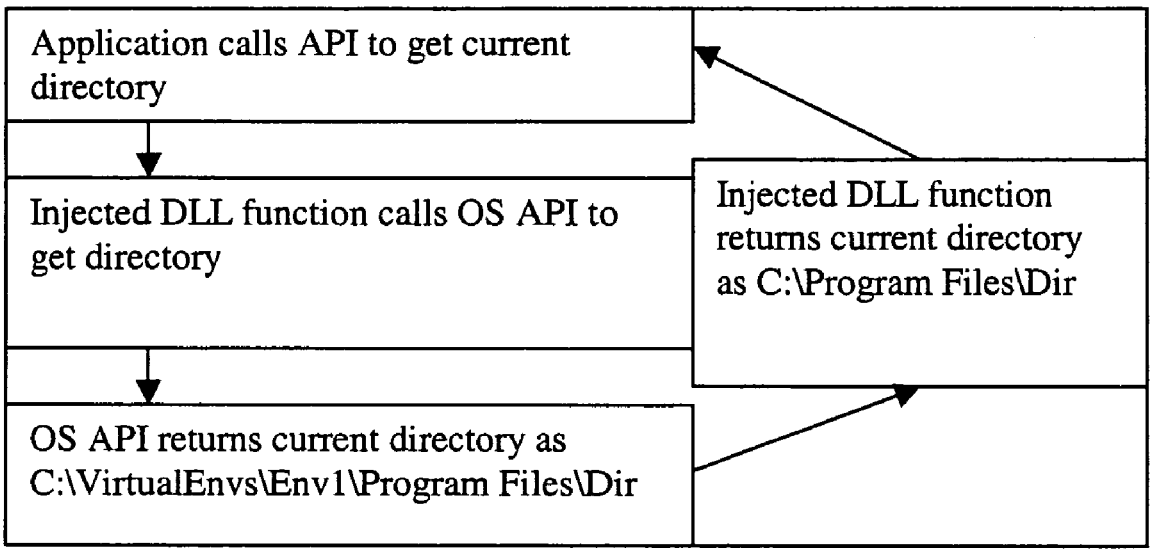
FIG. 6B shows how injected DLL functions maintain lists of these handles and the pathnames that they reference. These lists are then used in subsequent calls to OS API functions to modify the parameters properly.

This invention is directed to the creation of multiple, semi-independent virtual OS environments within a single operating system (OS). A change made in one environment does not affect the main OS or any other environment. In this way each virtual OS environment appears to be an independent OS for the applications running within it. The file system and registry information for each environment is independent of the base OS and other environments. Each of the environments can contain a group of installed applications that will run independently of each other. Although the invention is described in terms of a Windows® operating system environment, the approach is applicable to other operating systems through appropriate modification.

The applications running within the virtual OS environments still share the base OS attributes such as networking information, user login rights, services, hardware information, and the Windows clipboard. In addition, all of the applications run on a single OS desktop. The end user does not need to be aware that the applications are being run from different virtual OS environments. While the applications share the base OS attributes, the changes made to configuration information is made into the virtual OS environment and not into the base OS.

The virtual OS environment is achieved by creating independent locations for file systems and registry within the base OS file system and registry. When applications attempt to access the file system or registry, the attempt is redirected to the virtual OS environment file system or registry instead of the base OS location.

To create the virtual OS environments, the OS APIs that access the file system and registry directly and indirectly must be changed to redirect these accesses into the virtual OS environments file system and registry. This is done by injecting a DLL into every application that is executed. This DLL first must determine whether the current application should be run under one of the possible virtual OS environments or the base OS. If the current application is to run under the base OS the injected DLL does nothing and the application runs normally. If the current application needs to be redirected into a virtual OS environment, the injected DLL scans the applications function import table and redirects all file system and registry API calls to instead call functions within the injected DLL itself. This is done for the application functions and all of the DLLs that are loaded by the application. In addition, Windows COM calls that access the file system or registry are also redirected by the injected DLL.

When the application (or one of the applications DLLs) attempts to call an OS API (directly or indirectly) that will access the file system or registry, the injected DLL's function is called instead. The injected DLL's function then examines the parameters that are passed to the API and modifies them to direct them into the virtual OS environment location instead. The injected DLL's function then calls the real OS API with the modified parameters to perform the required function. Lastly, the injected DLL's function returns to the calling function, returning any information from the OS API function. This returned information is also modified to convert the file system or registry location information back from a virtual OS environment location. Using this method, the injected DLL functions can execute code both before and after the OS API function.

As mentioned earlier, not all applications are run from virtual OS environments and different applications may be run from different virtual OS environments. When the injected DLL is first loaded it must determine which of the virtual OS environments (if any) to redirect to. This must be done for the current application as well as any spawned or child processes created by the current application. This is determined based on the location of the current application EXE in the base OS file system. The base OS contains a list of directories where applications should be redirected to specific virtual OS environments. Any application EXE that is executed in this directory or optionally a child of this directory will run under a specific virtual OS environment. This is can be set to a CD/DVD drive in the base OS file system and the application run from this location is often a application installation program. Note that this directory is added to the virtual OS environment. File system accesses to this directory (or children) will not be redirected but will be performed in the directory itself. This directory (or directories) are shared by the base OS and the virtual OS environment. This allows the installation program or application to access support files that are then installed into the virtual OS environment.

In addition, any applications that are run from under the virtual OS environment file system (ex: C:\VirtualEnvs\Env1) are always redirected into that virtual OS environment. Since the temporary directory is also redirected into the virtual OS environment, if an installation program extracts additional installation programs from itself into a temporary directory and then executes them, they will be redirected into the same virtual OS environment. Since the installation program can only make changes to the virtual OS environment and the shared directory, it can only place files into a location that is under the virtual OS environment itself. It cannot change any file system or registry information in the base OS file system or registry except in shared directories. This method guarantees that the proper applications are always running in the proper virtual OS environment or base OS and that the applications can only modify specific areas of the base OS file system and registry.

Because all of the file system and registry calls are redirected, a copy of the base OS file system and registry must be created in the virtual OS environment file system and registry before any applications may be executed in the virtual OS environment. Once this is done, any built-in OS applications that are run by applications within the virtual OS environment (such as Notepad™ text editor, Wordpad™ word processor, or Internet Explorer® internet browser, all from Microsoft Corporation) will be executed from the virtual OS environment copy of that application. This will allow multiple versions of built-in OS applications to be supported at the same time in different virtual OS environments.

When an application that is being redirected into a virtual OS environment makes an API call that tries to access the file system or registry, the API is redirected to a function in the injected DLL. This is done without any modifications required to the application or support DLLs.

This redirection is done for all OS API calls that access the file system. There are file system calls that use a relative path. These calls are relative to a current directory. The getting and setting of the current directory are redirected into the virtual OS environment. The application views that it is accessing/modifying the base OS file system or registry when in fact it is accessing/modifying the virtual OS environment file system and registry.

The redirection of registry information is done the same way as file system information. All calls that access the registry are redirected into the injected DLL functions where they modify the parameters to redirect that registry access to a section of the registry that is private to the virtual OS environment. A number of registry and file system APIs are passed handles instead of a specific pathname. The injected DLL functions maintain lists of these handles and the pathnames that they reference. These lists are then used in subsequent calls to OS API functions to modify the parameters properly.

Since all of the virtual OS environment information is isolated inside of the base OS file system and registry, it becomes easy to save, store, and load entire virtual OS environments. It is therefore convenient to create a virtual OS environment that contains a set of applications configured in a specific way (or a "clean" virtual OS environment that contains no applications yet) and store it in a separate or central location to be used by multiple computers or the same computer at different times.

Not all OS API calls can be redirected by the injected DLL function modifying a parameter sent to or returned from the OS API. For example when creating a shortcut using the Program Manager DDE calls, the shortcut is created in the base OS file system (after backing up any shortcut in that same location) and then moved into the virtual OS environment file system. Afterward, any shortcut that was in the base OS file system is then restored. This occurs within the injected DLL function that is called from an application in the virtual OS environment.

Another special case occurs when a 16-bit application is to be executed within the virtual OS environment. The injected DLL does not function with 16-bit applications so this is normally not supported. In cases where the 16-bit application is known to only extract files from itself and then run a 32-bit application an exception is made. The 16-bit application is executed normally and allowed to place the extracted files into a temporary location in the base OS file system. This temporary location is then added as a shared directory with the virtual OS environment and the 32-bit application that was extracted is then executed in the virtual OS environment.

Since the virtual OS environment file system files are not being used by the base OS itself, they can be replaced more easily than the actual base OS files that are normally in use (files that are in-use cannot normally be replaced except during a reboot). This also allows a reboot after an installation program to be handled without a reboot being required on the computer itself.

When the OS reboot API is called by a program that is running under a virtual OS environment, the injected DLL function performs the operations normally handled by the reboot without allowing the OS API to perform a system reboot. All of the applications in the virtual system are shutdown. The list of files that are queued to be replaced during a reboot are then installed. The list of applications that are normally run during a system startup are then executed in order. This allows application installation programs that contain require one or more reboots function properly without a reboot actually being performed.

We claim:

1. A computing machine having a computing architecture, comprising:
    a base operating system (OS) installed to the computing machine, the base OS having a base OS file system and a base OS registry;
    at least one virtual OS environment within the base OS, the virtual OS environment having a virtual OS file system and a virtual OS registry which are independent of the base OS file system and the base OS registry, wherein a dynamic link library (DLL) is injected into an application running under the virtual OS environment, the DLL being programmed to
    determine that the application should be run under the virtual OS environment instead of the base OS;
    call a function of the injected DLL rather than calling an API of the base OS;
    modify at least one parameter from a calling function of the application to direct the at least one parameter to a location of the virtual OS environment;
    after modifying the at least one parameter, call the API of the base OS with the at least one modified parameter;
    receive information from the API of the base OS;
    modify the information from the API of the base OS to convert the information back from a virtual OS environment location;
    return the information to the calling function of the application.

2. The computing machine of claim 1, wherein the application running under the virtual OS environment shares one or more of the following with the base OS:
    working information,
    user login rights,
    services,
    hardware information, and
    clipboard information.

3. The computing machine of claim 1, further including multiple virtual OS environments within the base OS, and wherein a change made in one of the virtual OS environments does not affect the base OS or any of the other virtual OS environments.

4. The computing machine of claim 1, wherein each virtual OS environment contains a group of installed applications that run independently of one another.

5. The computing machine of claim 1, further including one or more applications running under the base OS and each virtual OS environment, and wherein all of the applications run on a single OS desktop.

6. The computing machine of claim 1, wherein a change made to configuration information with respect to the virtual OS environment does not change configuration information associated with the base OS.

7. A method of configuring a computer with a base operating system (OS) having a base OS file system and registry, the method comprising the steps of:
    creating at least one virtual OS environment under the base OS, each virtual OS environment having a virtual OS file system and virtual registry which are independent of the base OS file system and registry;
    injecting a DLL into every application that is executed under the virtual OS environment;
    determining that at least one application should be run under the virtual OS environment instead of the base OS, wherein the DLL performs the determining;
    calling a function of the injected DLL rather than calling an API of the base OS, wherein the DLL performs the calling;
    modifying at least one parameter from a calling function of the application to direct the at least one parameter to a location of the virtual OS environment, wherein the DLL performs the modifying;
    after modifying the at least one parameter, calling the API of the base OS with the at least one modified parameter, wherein the DLL performs the calling;
    receiving information from the API of the base OS, wherein the DLL performs the receiving;
    modifying the information from the API of the base OS to convert the information back from a virtual OS environment location, wherein the DLL performs the modifying of the information;
    returning the information to the calling function of the application, wherein the DLL performs the returning.

8. The method of claim 7, further including the step of altering one or more application programming interfaces (APIs) that access the base OS file system and registry directly and indirectly so as to redirect these accesses into the appropriate virtual OS file system and registry.

9. The method of claim 7, further including the step of creating a copy of the base OS file system and registry in the virtual OS environment file system and registry.

10. The method of claim 9, wherein the application running under the virtual OS environment is executed using the copy in the virtual OS environment file system and registry.

11. The method of claim 7, further including setting a predetermined directory such that an application running under the predetermined directory will be redirected to the virtual OS environment based on the location of the application being under the predetermined directory.

12. The method of claim 11, wherein the predetermined directory is a CD/DVD drive in the base OS file system.

13. A method of configuring a computer with a base operating system (OS) having a base OS file system and a base OS registry, the method comprising the steps of:

creating a virtual OS environment within the base OS, the virtual OS environment having at least one of:
  a virtual OS file system that is independent of the base OS file system;
  a virtual OS registry that is independent of the base OS registry;
injecting a dynamic link library (DLL) into an application;
redirecting, via the DLL, an attempt by the application to access the base OS to at least one of:
  the virtual OS file system of the at least one virtual OS environment;
  the virtual OS registry of the at least one virtual OS environment;
wherein the redirecting comprises:
determining that the application should be run under the virtual OS environment instead of the base OS, wherein the DLL performs the determining;
calling a function of the injected DLL rather than calling an API of the base OS, wherein the DLL performs the calling;
modifying at least one parameter from a calling function of the application to direct the at least one parameter to a location of the virtual OS environment, wherein the DLL performs the modifying;
after modifying the at least one parameter, calling the API of the base OS with the at least one modified parameter, wherein the DLL performs the calling;
receiving information from the API of the base OS, wherein the DLL performs the receiving;
modifying the information from the API of the base OS to convert the information back from a virtual OS environment location, wherein the DLL performs the modifying of the information;
returning the information to the calling function of the application, wherein the DLL performs the returning.

14. The method of claim 13, further comprising:
scanning a function import table of the application, wherein redirecting the attempt by the application comprises redirecting, via the DLL, file system and registry calls from the application to functions within the injected DLL, wherein the DLL performs the scanning.

15. The method of claim 13, wherein:
the attempt to access the base OS comprises an attempt to install at least one file in the base OS file system.

16. The method of claim 15, wherein:
the attempt to install the at least one file in the base OS file system comprises an attempt to reboot the computer.

17. The method of claim 15, further comprising:
shutting down the application running under the at least one virtual OS environment;
after shutting down the application, installing the at least one file in the virtual OS file system of the at least one virtual OS environment;
after installing the at least one file, executing the application under the at least one virtual OS environment.

18. The method of claim 17, wherein:
shutting down the application running under the at least one virtual OS environment and installing the at least one file in the virtual OS file system of the at least one virtual OS environment are conducted while the base OS is running.

* * * * *